United States Patent
Matter

[11] Patent Number: 5,128,505
[45] Date of Patent: Jul. 7, 1992

[54] INJECTION DEVICE AND ELECTRODE WIRE ELECTRIC DISCHARGE MACHINE FOR HIGH-SPEED PRECISION MACHINING

[75] Inventor: Daniel Matter, Chatelaine, Switzerland

[73] Assignee: Charmilles Technologies S.A., Meyrin, Switzerland

[21] Appl. No.: 472,829

[22] Filed: Jan. 31, 1990

[30] Foreign Application Priority Data

Jan. 31, 1989 [CH] Switzerland ............. 00325/89

[51] Int. Cl.⁵ ............................................. B23H 7/10
[52] U.S. Cl. ................................... 219/69.12; 226/97
[58] Field of Search ................ 219/69.12, 69.14; 226/97

[56] References Cited

U.S. PATENT DOCUMENTS

| | | | |
|---|---|---|---|
| 4,733,041 | 3/1988 | Obara | 219/69.12 |
| 4,740,667 | 4/1988 | Obara | 219/69.12 |
| 4,973,812 | 11/1990 | Aramaki et al. | 219/69.12 |

FOREIGN PATENT DOCUMENTS

| | | |
|---|---|---|
| 142034 | 5/1985 | European Pat. Off. |
| 229186 | 7/1987 | European Pat. Off. |
| 271439 | 6/1988 | European Pat. Off. |
| 62-271630 | 11/1987 | Japan ............ 219/69.12 |
| 63-16924 | 1/1988 | Japan ............ 219/69.14 |
| 63-162119 | 7/1988 | Japan ............ 219/69.12 |

*Primary Examiner*—Geoffrey S. Evans
*Attorney, Agent, or Firm*—Gifford, Groh, Sprinkle, Patmore and Anderson

[57] ABSTRACT

The injection device for machining liquid comprises a nozzle (9) sliding in a mobile element (7) which itself slides inside a housing (1) fixed to a machining head, these three elements forming an injection chamber (2) with the base of this head. The nozzle (9) and the mobile element (7) are profiled in such a way as to delimit a pressure chamber (30) along one of the sides (31) of a shoulder (11) built on the periphery of the nozzle (9), as well as a second chamber (20) along the opposite side of this shoulder (11). The nozzle (9) has openings (28) linking this pressure chamber (30) to the injection chamber (2). The mobile element (7) has openings (10) linking the chamber (20) with the atmospheric pressure. The shoulder (11) is sized so that the pressure created in the chamber (30) at least partly counterbalances the pressure created in the injection chamber (2) and acts on the nozzle (9) in the opposite direction.

13 Claims, 2 Drawing Sheets

INJECTION DEVICE AND ELECTRODE WIRE ELECTRIC DISCHARGE MACHINE FOR HIGH-SPEED PRECISION MACHINING

BACKGROUND OF THE INVENTION

The present invention relates to a device mounted in a machining head and capable of injecting a compressed machining fluid along an electrode wire to wash the slot machined in the part by the wire; it relates also to a device sliding along the latter in a housing fixed to the machining head; it relates in particular to a device enabling a wire EDM machine to operate accurately and at high speed.

DESCRIPTION OF THE PRIOR ART

In this type of machine tool, an electrode wire runs continuously along an ideal line linking two wire guides (and defining the machine zone), from a feed system to a recovery system. By the term "wire" electrode, we also mean any electrode-tool which continuously repeats itself by moving across the machining area, whatever the profile of the section, such as tapes, strips, etc. It is several tenths or hundredths of millimeters in thickness. By "electric discharge", we mean a machining method according to which a machining fluid is introduced in the area where the electrode-wire (electrically powered) is brought into proximity with the workpiece. The role of the fluid consists, in particular, in eliminating from this area all debris removed from the machined piece and in cooling the electrode-wire and, in some cases, the contacts which supply it with electricity. This fluid is normally dielectric and consists of, for example, deionized water and a mixture of water and hydrocarbons. Machining is carried out by introducing the electrode-wire into an opening which crosses the piece (or by putting it into contact with an edge of the piece), by supplying it with electric current through two contacts located on either side of the piece, and by sending voltage pulses between the electrode-wire and the workpiece so as to create electric discharges within the machining area, these latter removing notably material from the piece (and a bit from the tool).

A slot is thus realized in the piece as the wire and the tool move in relation to one another, in general along a preprogrammed path. In most of the machines known, the piece and the upper wire guide both move along a horizontal plane, in a displacement which can be broken down into two perpendicular axes (axes X and Y for the piece, axes U and V for the wire guide), which allows inclining the wire in relation to the vertical position; this upper wire guide is mobile along a vertical axis (axes Z) and the distance between both wire guides is therefore adjustable.

As shown above, the wire guides and the contacts supplying machining current to the wire are mounted in two machining heads located on either side of the piece; the device which enables moving the upper head in a controlled manner in the horizontal plane and thus slanting the wire, according to a given strip angle, is generally comprised of a cross motion table fixed in a cantilevered position at the extremity of the upper arm, and under which the head is attached by a console system.

Each of these heads is provided with a hollow section located at the end opposite the workpiece. This tubular structure, referred to later on as the "housing", features a rim designed to hold the full set of elements which enable injection of the dielectric fluid in the machined slot and which has at least one nozzle. This housing is provided with at least one feed hole for the liquid, linked to an electric valve for example which is itself linked to the EDM machine numerical control so as to regulate the injection pressure of this liquid. This housing also has a sheath surrounding the electrode wire and in which a guide is fitted to maintain the wire in the axis of the head; this sheath may be equipped with a feed hole and may be profiled so as to canalize the liquid in order to form a jet along the wire, for example in cases where the wire guides and the electric feed contacts are cooled. This sheath is linked with the nozzle opening.

An injection chamber is formed by the side of the machining head opposite the workpiece, the tubular wall of the housing and that of the nozzle or the set of organs enabling injection.

It has been seen that methods are generally provided for adjusting and varying the distance between the upper wire guide and the surface of the workpiece; this makes it possible to bring the extremity of the housing and thus the nozzle in proximity with the machined slot and even in contact with the piece, especially to ease insertion of the electrode wire through the start opening prior to beginning machining, or its reinsertion after rupture. For high pressures, it is recommended, in the present state of the art, to press the injection device firmly against the piece so as to avoid vibrations and turbulences owing to the pressurized liquid leaking between the nozzle and the workpiece.

The state of the art also refers to measures provided for on wire electric discharge machines to have the injection organs slide in the housing in the machining head, in particular along the axis of the electrode wire and from a rest position to a work position where they are flattened against the workpiece or, on the contrary, maintained at a given distance of the surface of the workpiece. Their travel is limited by a stop or by the surface of the piece itself. Generally, the return to the rest position can be carried out by means of a return spring.

As examples, we shall mention the devices described in EP Pat. No. 142.034 or some of those illustrated in U.S. Pat. No. 4,704,500 (FIGS. 3 and 4) or in U.S. Pat. No. 4,481,095 (FIGS. 3 and 4), or even in FIG. 4 from U.S. Pat. No. 4,675,492, in which the position of the nozzle is the result of an equilibrium between the pressure in the injection chamber, the repelling force due to the weight of the nozzle and/or a spring, as well as the resistance by the liquid injected between the nose of the nozzle and the surface of the workpiece.

Another type of sliding nozzle, which, as a result of a shock for example, may be retracted in the housing, are described for example in EP Pat. No. 271.439 or in U.S. Pat. No. 4,675,492. In an effort to maintain the nozzle as close as possible to the piece during machining or to allow it to pivot around a vertical axis for example, or yet again to reduce if necessary, the pressure exerted on the surface of the piece by the nose of the nozzle, one proposal consists in fitting the nozzle firmly inside the housing, (or by means of a "floating" or "elastic" method).

For example, owing to springs located on either side of the shoulder built on the periphery of the nozzle, in the spaces between housing and nozzle, and supported by the rim of the housing forming a stop and on the extremity of the head demarcating the injection chamber, as in the device described in FIG. 2 of U.S. Pat. No. 4,704,511, or yet owing to an assembly like that described in FIG. 4 of U.S. Pat. No. 4,675,492, according to which a part of the fluid is injected so as to partly counterbalance the pressure on the injection chamber on the lower nozzle so as to reduce the force with which the latter is pressed against the piece.

Also, in the case of these "floating" nozzles, the distance separating the nose of the nozzle from the surface of the piece is the result of an equilibrium between the pressure in the injection chamber, the forces exerted on the shoulder built around the nozzle, the weight of the latter, as well as the resistance set up by the compressed liquid between the nose of the nozzle and the surface of the piece.

However, none of these known devices eliminate the disadvantages of repelling forces caused by injecting a compressed liquid in the machined slot. These forces are transmitted by the injection chamber to the machining head and from there, to the mechanism assembled to this latter in certain types of machines allowing for a slanted positioning of the wire by controlling the displacements of this head in a plane parallel to the work surface (defined by the axes U and V). These forces tend to raise the head or the assembly. This modifies the positioning of the wire guide (or guides) fitted in this machining head and, where appropriate, the inclination of the wire. This deviation of the wire from its cutting path falsifies the geometry of the machined piece and causes a loss in accuracy.

This fault is increased with the injection pressure and becomes sensitive especially during high-speed machining and therefore with high injection pressures which may attain several tens of atmospheres. However, such pressures also become necessary because the heating of the wire and the removal of material increase with machining speed.

Furthermore, these repelling forces vary with the type of injection device and with its mode of operation, in particular with respect to using a nozzle which is close to the piece or which really comes into contact with the latter.

It is possible to use certain methods for countering the thrust nozzle and by the volume of compressed liquid between the piece and the nose of the nozzle when the latter is not pressed against the piece causing retraction of the nozzle, but this effort is transmitted to the machining head and possibly to the cross motion table controlling the displacement of the latter with the disadvantages mentioned above.

A device counterbalancing these repelling forces by injecting the liquid at the same pressure in the organ designed to set up a repelling force in the opposite direction on the cross motion mechanism is described in the patent EP Pat. No. 229.186, but this requires considerable modification of the control equipment and increases the space requirement in the machining area.

It is for this reason that the aim of the present invention was that of an injection device, as defined in the introduction, capable of considerably reducing, that is to say in a manner which retains acceptable accuracy for machining carried out at high injection pressures, the resulting repelling forces due to the emission of a pressure jet, onto the machining head on which it is assembled, (and, where necessary, on the movement control mechanisms).

A first measure consisted in profiling the "nose" of the nozzle it such a way that this section was as small as possible, and a fine spray nozzle was developed by the applicant and described in EP Pat. No. 271.439. This is a device featuring an injection element with an orifice equipped with a moveable sliding in a tapered element which itself slides within a tubular element fixed to the end of the machining head, these two elements forming an injection chamber with the end of the machining head. This device was designed to be maintained at a given distance from the surface of the part. However, the reduction in thrust thus obtained is not enough to use higher injection pressures, which leads to a modification of the very structure of the device.

The injection device according to the present invention is set forth in the environment of a wire electroerosion machine, but it can also be used advantageously in other fields. One of the primary advantages of the nozzle of the present invention is that a balanced condition can be maintained during the pressurizing of the injection device, and, thus, the injection device nozzle is no longer subjected to repelling forces due to pressure exerted from the nozzle on the part to be machined or from the film of fluid under pressure which separates the injection device nozzle from the part. In effect, under the teachings of this invention, it is possible to configure the shoulder of the nozzle so that the pressure exerted on the nozzle by the fluid from the pressure chamber partially counterbalances or completely balances the pressure acting on the projected area of the nozzle by the fluid in the injection chamber. The repelling force due to the friction of the fluid on the nozzle, as well as the nozzle weight, are negligible. It is, therefore, possible to form the nozzle of an upper head like that of a lower head.

Another advantage of the nozzle of this invention is that it can be sized and configured so that it does not spring out of its mobile element except when the force of the jet is reduced following an encounter with an object. During the pressurizing of the injection chamber, the mobile part slides in the housing so that it projects from the housing to its maximum extent. If the jet from the nozzle does not strike and obstacle or working surface, the pressure prevailing in the injection chamber preferably will be insufficient for counterbalancing the pressure prevailing in the pressure chamber and retracting the nozzle. It is only when the jet encounters an object that the nozzle will be moved to project out of the mobile element. This eliminates any risk of collision of the nozzle with an obstacle such as an edge of the part. In the prior art the nozzles would project from their housing as soon as injection pressure was established so that it was necessary to regulate very precisely (to approximately a 1/10 of a millimeter) the distance between the injection device and the surface of the part. That is, if the distance is too large between the nozzle and the part, the injection is inefficiently effective, and if the distance is too small the nozzle will strike the part or if the nozzle projects from the head before it faces a part, it will abut against it.

The meticulous regulation of the distance between the injection device and the part as well as the synchronization of the establishment of the injection pressure and of the movement of the head facing the part are no longer necessary under the teachings of this invention since the nozzle does not move out except when the device is facing the part, and then it moves out when facing the part, and because of its "floating" construction the nozzle stops exactly at the desired height, that is as soon as it comes into contact with the part, without striking the part. The foregoing adjustment is automatic and precise and is not subject to any signal from the numerical control of the EDM machine. It also has the advantage of being practically instantaneous. Thus regardless of the side of the part being approached, the position of the nozzle is instantaneous and automatically adjusted to the height of the part without the requirement of measurement of this height and programming it into the control system beforehand.

The nozzle of the present invention automatically adjusts for variation is height as the nozzle progressively moves along the path to be cut. In effect, the nozzle can follow the surface of the part, even when the part has irregularities such as hollows or reliefs providing of course that the irregularities are greater than the section of the nozzle. It is no longer necessary to program for relief variations of the part.

One of the primary advantages of the nozzle of the present invention over my nozzle described in EP Pat. No. 271439 is that the present nozzle can be retracted automatically in order to skip over obstacles, such as fastening elements. This movement can take place in response to a signal emitted by the numerical control. The retraction takes place without modifying the position of the wire guide. It is easy to memorize the positions where the fastening elements are and where the retraction takes place and to program the position of zones, for example, rectangular or circular zones, for which the numerical control will emit a signal which causes the injection to stop and the nozzle to rise back into its rest position as soon as the path of the nozzle is engaged in one of these zones. It is possible not to interrupt the machining while avoiding these objects, for example, by using a projection strategy such as those defined in Swiss patent application No. 100/89.

Thus, protection strategies allow modification of machining parameters when the height of the part varies or in the case of striking an edge of the part as set forth in the application mentioned above, and they can be used without additional programming because of the "intelligent" injection device of the present invention.

BRIEF DESCRIPTION OF THE DRAWING

The machining fluid injection device according to the present invention can have an infinite number of forms. The preferred from of these many possible variations has been diagramatically illustrated in the drawing in which.

DESCRIPTION OF THE PREFERRED EMBODIMENT

Figure 1:
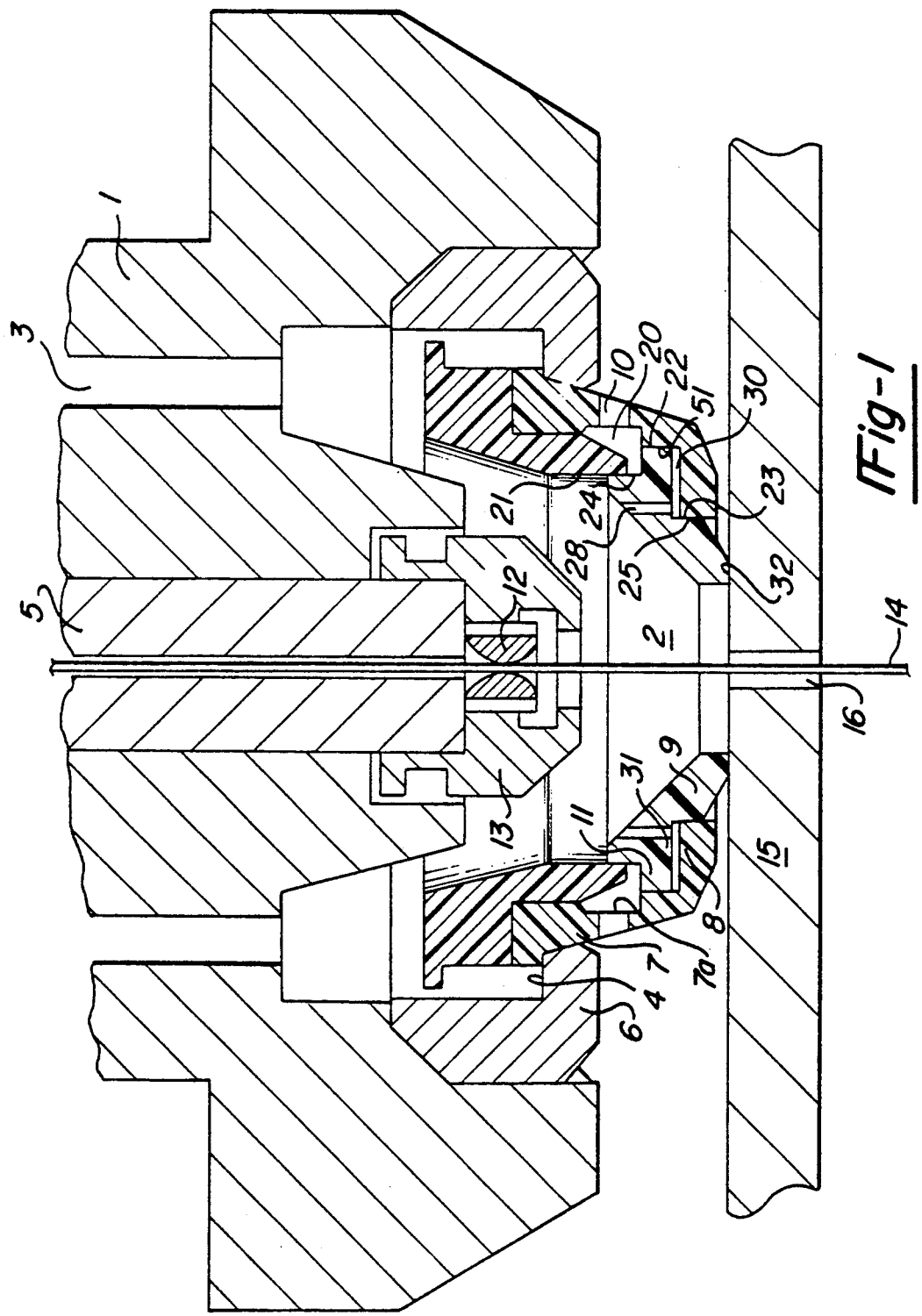
FIG. 1 shows the device of the invention in a work position with its axis arranged vertically and perpendicular to the surface of the part to be machined.

Referring to FIG. 1, the housing 1 is attached to the end of the machining head with the machining head being illustrated as an upper head. Only the end facing the part to be machined is shown in the drawing along with a diagrammatic showing of the wire guide 12 and the threading nozzle 13 which are mounted in sheath 5. The machining fluid is brought into the injection chamber 2 through channels 3 arranged on either side of sheath 5.

Ring 6 is attached to the end of housing 1 and is provided with an edge 4 on which the truncated tapered part 7 rests. Part 7 consists of two elements, one fitting inside the other, and it is profiled to have a recess 7a and an edge 8 on which the nozzle 9 rests. Part 7 has openings 10 putting the recess 7a in communication with the atmosphere.

Nozzle 9 is also truncated and tapered, and it is provided with a shoulder 11 which is profiled to obstruct recess 7a, thus forming annular chamber 20. Shoulder 11 of nozzle is also configured to rest on edge 8 of part 7 while sliding along the cylindrical wall portion 22 of part 7, thus forming a sealed annular chamber 30.

Nozzle 9 has three cylindrical wall portions 24, 51 and 25 which slide respectively along cylindrical wall portions 21, 22, and 23 of part 7. Openings 28 through nozzle 9 put chamber 30 in communication with injection chamber 2 defined by the housing 1, sheath 5, part 7 and nozzle 9. The outlet opening of nozzle 9 is facing the end of sheath 5, and the axis of the jet emitted by nozzle 9 is the same as the axis of the wire 14 when this wire is perpendicular to the surface of part 15 to be machined.

In order to avoid the possibility that nozzle 9 and part 7 act as electrodes and thus become accidently machined by the wire, they are preferably produced from an insulating material, for example, a plastic material. The machining fluid is brought into injection chamber 2 under high pressure, produced by means not shown, through channels 3. The pressure of this fluid pushes the part 7 against edge of ring 6 and allows the part 7 to fit tightly in the ring 6, thus avoiding the escape of fluid between the two parts. The bore of wire guide 12 is generally kept very close to the section of wire 14 which stops machining fluid from escaping in any great quantity through this opening. Nevertheless, a sealing joint can be provided around the wire if desired.

Nozzle 9 slides easily along part 7 since the configuration of the lower surface 31 of the nozzle shoulder 11 has been selected so that the force exerted on it by the fluid under pressure in chamber 30 completely counterbalances the force exerted on the nozzle by the fluid under pressure in the injection chamber 2. Equilibrium conditions exist when the nozzle is functioning by emitting a jet of fluid into slot 16 machined in part 15 by the wire 14. Since the nozzle 9 exerts practically no pressure or only a slight pressure on the part 5 to be machined, the part 5 exerts practically no repelling force on the nozzle 9. Only the opposite reaction force by the part to the jet which is transmitted to the machining head is to be taken into account. This involves the surface 32 of the nose of the nozzle 9 which comes into contact with the part 15 which has a section of one centimeter in diameter with its mouth a diameter of seven millimeters.

Figure 2A:
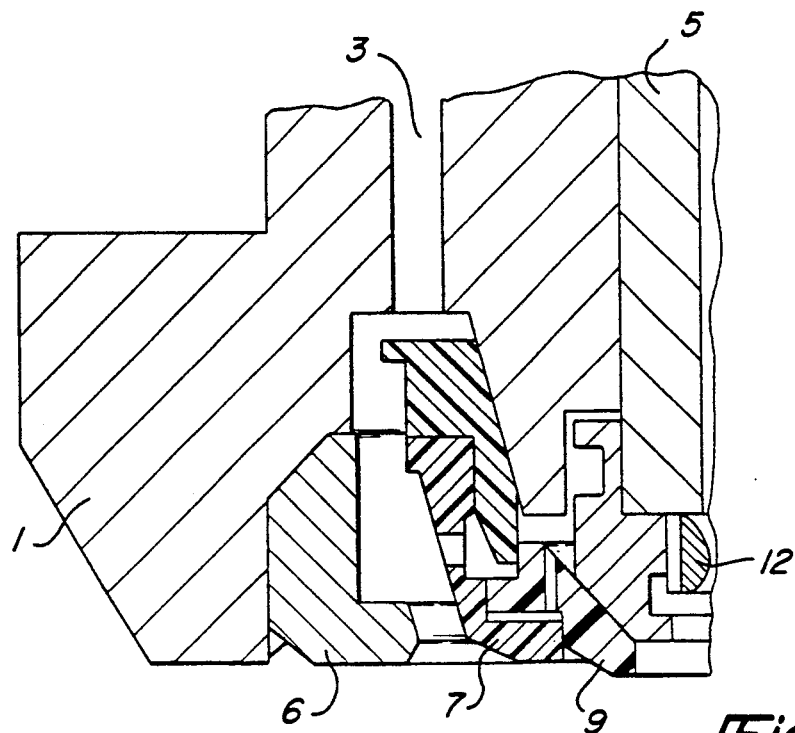
FIG. 2A shows the device in diagrammatic form according to the invention in its rest position and FIG. 2B shows the device in diagrammatic form according to the invention in its work position.
Figure 2B:
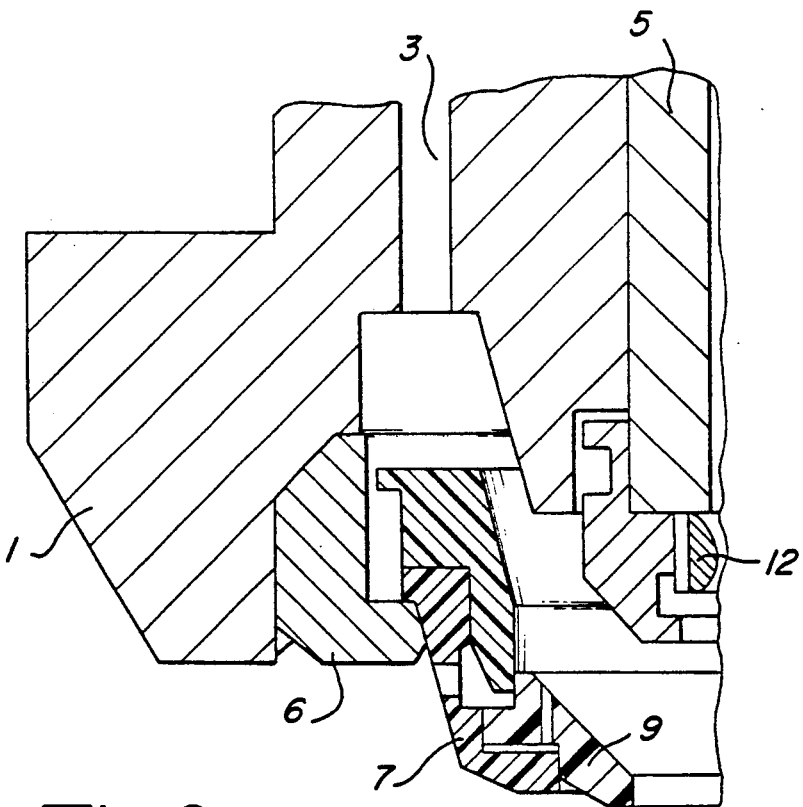

The mobile element 7 is profiled so that it can be retracted completely into the housing 1, and the nozzle 9 is profiled so that it can be retracted into the element 7 as shown in the left hand side of FIG. 2.

The repelling force transmitted to the machining head during the functioning of the nozzle is therefore proportional to the surface area of the jet. In contrast with the device of the type described in patent application EP 271,439, nozzle 9 simply slides along the part 7 while being held by a spring, not shown, attached to the sheath 5 (therefore without the device with the pressure chamber 20 described herein), this repelling force would be proportional to the whole surface area of contact between the nozzle and the part, that is, approximately doubled that exerted on the device of the present invention.

The construction of the device of the present invention in which the nozzle 9 has small diameter sliding along part 7 mounted between in and the housing 1 provides another advantage. Even when the pressure in chamber 30 is such that it counterbalances only a part of the pressure of the injection chamber, because of the small cross section of the opening of the nozzle 9 with respect to that of housing 1, any variation of its position along the wire 14, caused, for example, by unevenness of the surface of the machined part, only transmits a small pressure to the fluid of the injection chamber and therefore to the machining head, particularly to the wire guide 12.

Many variations of the preferred embodiment are possible. For example, the nozzle can be mounted so that it is not retractable in the case of a frontal impact, and the pressure balancing feature of the invention will remain operative. The mobile element can be shaped to incline out of its work position under the effect of exterior forces not parallel to the repelling force as described in EP Pat. No. 271,439.

A spring or other elastic component can be arranged between the mobile element and the edge of the housing in which the element rests in order to help in the retraction of the mobile element. A spring can be arranged above the element to retract into the work position.

The mouth of the nozzle, instead of being cylindrical with an axes perpendicular to the part, can be oblique, the device having, for example, a means of causing the nozzle to turn around a vertical axes in order to direct the jet against the deflection of the wire.

A system enabling the wedging of the mobile part in its rest position, retracted into the injection chamber, can be installed in the present invention in the same way as the O-ring joint described in EP Pat. No. 271,439. The mobile part and nozzle can have shapes other than the tapered truncated shaped; however, this shape leads to a minimum bulk in the zone of machining.

The nozzle can be shaped so that the pressure produced in chamber 30 only counterbalances a part of the forces pushing towards the part to be machined for the purpose of reducing the repelling force exerted on the device without cancelling this force.

Since the surface area of the nozzle in contact with the part to be machined has practically no influence of the repelling force exerted on the machining head, this surface area can be rather large although the mouth is preferably as narrow as possible.

I claim:

1. Injection device for pressurized machining fluid comprising a nozzle sliding within a mobile element which itself slides within a housing fixed to a machining head, this housing, this mobile element and this nozzle forming an injection chamber with the base of this head, in which:
   the nozzle and the mobile element are profiled in such a way as to demarcate a first pressure chamber along one of the sides of a shoulder fashioned on the periphery of the nozzle, as well as a second chamber along the opposite side of this shoulder;
   the nozzle features openings permitting communication of said first pressure chamber with the injection chamber;
   the mobile element features opening permitting communication of the second chamber with the atmospheric pressure;
   said first pressure chamber and said second chamber are located on opposite sides of the aforementioned shoulder in such a way that the pressure existing in said first pressure chamber and the pressure existing in the injection chamber act on the nozzle from opposite directions.

2. Device according to claim 1, in which the shoulder of the nozzle is sized so as to demarcate said first pressure chamber whose surface area is equal to that of the projection, on a plane parallel to the shoulder, of the wall of the nozzle directing the jet.

3. Device according to claim 1, in which the shoulder is orthogonal to the axis of the injection device.

4. Device according to claim 1, in which the mobile element is tapered.

5. Device according to claim 1, in which the nozzle is tapered.

6. Device according to claim 1, in which the mobile element is retractable into the housing.

7. Device according to claim 1, in which the section of the opening of the nozzle is reduced in comparison with that of the housing.

8. An electroerosion machine having at least one machining head for cutting a part with electrode wire, said electroerosion machine having a fluid injection device mounted on at least one of the machining heads of said machine in order to spray pressurized machining fluid along said wire and to lubricate a groove being machined in the part by said wire, said injection device further comprising:
   a housing fixed to one of said machining heads;
   a mobile element sliding within said housing;
   a nozzle sliding within said mobile element;
   said nozzle and said mobile element being profiled to define a first pressure chamber along one of the sides of a shoulder fashioned on the periphery of said nozzle and to define a second chamber along the opposite side of said shoulder;
   said nozzle having an opening permitting communication of said first pressure chamber with said injection chamber;
   said mobile element having an opening in communication with said second chamber providing a vent to atmospheric pressure;
   said first pressure chamber and said second pressure chamber being located on opposite sides of said shoulder such that the pressure existing in said first pressure chamber and the pressure existing in said injection chamber act on the nozzle from opposite directions.

9. The machine according to claim 8, in which the machining head having said injection device attached is fixed to a cross motion table.

10. The process supplying pressurized machining fluid from an injection chamber along an electrode wire toward a part being machined by said wire, said injection chamber being formed by a mobile element sliding in a housing and a nozzle sliding in said mobile element, comprising the following steps:
   providing said nozzle with a shoulder having an upstream and a downstream side;
   profiling said nozzle and said mobile element to delineate a first pressure chamber along the downstream side of said shoulder and to delineate a second chamber along the upstream side of said shoulder;

providing communication between said first pressure chamber and said injection chamber;

providing communication between said second pressure chamber and atmospheric pressure; and configuring said first and second pressure chambers so that the thrust exerted on the nozzle by the fluid in said first pressure chamber at least partly counterbalances the component parallel to the thrust exerted on the nozzle by fluid in the injection chamber.

11. The process according to claim 10, in which the pressure exerted on the nozzle by the fluid in said first pressure chamber equilibrates the component, parallel to this thrust, of the pressure exerted on said nozzle by the fluid in said injection chamber.

12. The process according to claim 10, in which the nozzle springs from the mobile element only when the jet of fluid coming from the nozzle encounters a nearby object.

13. The process according to claim 10, in which a vertical retreat of the nozzle transmits only a low thrust to the fluid in the injection chamber and therefore to the machining head because of the reduced cross section of the opening of said nozzle in relation to the cross section of said housing.

* * * * *